United States Patent

Bremer

[11] 3,964,796
[45] June 22, 1976

[54] ADAPTIVE ANTI-LOCK BRAKE CONTROL APPARATUS

[75] Inventor: Richard J. Bremer, Flint, Mich.

[73] Assignee: General Motors Corporation, Detroit, Mich.

[22] Filed: Mar. 27, 1975

[21] Appl. No.: 562,509

[52] U.S. Cl.............................. 303/21 BE; 303/20; 303/21 AF
[51] Int. Cl.²........................................... B60T 8/02
[58] Field of Search............. 188/181 C; 303/20, 21; 307/10 R; 317/5; 324/161; 340/53, 62

[56] References Cited
UNITED STATES PATENTS

| | | | |
|---|---|---|---|
| 3,744,851 | 7/1973 | Burckhardt et al............. | 303/21 BE |
| 3,790,227 | 2/1974 | Dozier............................ | 303/21 BE |
| 3,832,013 | 8/1974 | Davis et al....................... | 303/21 P |
| 3,838,890 | 10/1974 | Wind.............................. | 303/21 BE |
| 3,861,758 | 1/1975 | Oglesbee et al................... | 303/21 P |

*Primary Examiner*—Trygve M. Blix
*Assistant Examiner*—Stephen G. Kunin
*Attorney, Agent, or Firm*—Warren D. Hill

[57] ABSTRACT

An anti-lock brake control apparatus especially suited to heavy duty trucks with air brakes senses the wheel speeds on a given axle and cyclically releases and applies the brakes on that axle as required to avoid undesirable wheel slip during braking. In one control channel, a deceleration switch responsive to a wheel speed signal produces a brake release signal when wheel deceleration exceeds a predetermined threshold. A second parallel channel, also responsive to wheel speed, derives a velocity error signal representing the difference between wheel speed and an estimated vehicle speed and produces a release signal when the velocity error exceeds a value which varies as a function of wheel speed. The velocity error is determined by comparing the wheel deceleration with an estimated vehicle deceleration and integrating the difference. The second channel also includes an acceleration switch connected to the release integrator to quickly remove the velocity error signal when a predetermined wheel acceleration occurs to effect brake reapplication. A self-check circuit includes a timer producing an output signal which increases with time and a synchronous reapply circuit connected to the second channel to effect brake reapplication when a time period has expired. The timer is operative when a self-check accelerometer indicates that the wheels experience low positive or negative acceleration and when a self-check logic circuit indicates that the control circuit calls for a brake release. A comparator and latch circuit responsive to the timer output signal is actuated when a second larger time period has expired and is effective to illuminate a warning lamp and to disable the control circuit. The timer is retarded when a large velocity error signal is present to extend the time periods for brake reapplication and disabling of the circuit.

3 Claims, 4 Drawing Figures

ADAPTIVE ANTI-LOCK BRAKE CONTROL APPARATUS

This invention relates to an anti-lock control apparatus for vehicle brakes and particularly for such a control apparatus which is adaptive to various road conditions.

The U.S. patent application Ser. No. 561,159, filed by Richard J. Bremer on Mar. 24, 1975, and which is a Continuation of U.S. patent application Ser. No. 419,693, filed on Nov. 28, 1973, now abandoned, sets forth an anti-lock brake control especially suited to heavy trucks and particularly includes control circuitry responsive to road conditions and to the loading of the truck. One aspect of that brake control is a synchronous reapply circuit which is used to reapply the brakes following a release cycle when the controlled wheel experiences only small positive or negative acceleration for a preset time. This circuit prevents extraordinarily long releases which may occur due to an erroneous vehicle deceleration estimate, particularly at very low speeds approaching a stop condition. It has been found, however, that there are some circumstances in which an unusually long release time is desirable, for example where a short wheel base truck may undergo a weight transfer during braking or a truck with a pneumatic brake system may suffer a long delay in response to electronic brake control signals. Then the brakes may tend to experience low speeds for long periods and brake reapplication is undesirable until wheel speeds tend to recover to near normal values.

It is therefore an object of this invention to provide an improved anti-lock brake control incorporating a synchronous reapply circuit which discriminates between those conditions where a long brake release is desirable and those in which it is undesirable.

The invention is carried out by providing in an anti-lock brake control circuit a synchronous reapply circuit effective during brake release to cause brake reapplication when the controlled wheel experiences only low acceleration for a certain time interval, and a circuit responsive to the amount of wheel speed deviation from an estimated vehicle speed to extend the time interval according to the wheel speed deviation.

The above and other advantages will be made more apparent from the following specification taken in conjunction with the accompanying drawings wherein like reference numerals refer to like parts and wherein.

While this invention is considered to be of general application to wheeled vehicles, it is disclosed herein as applied to heavy trucks with air brakes. In such vehicles it is contemplated that each axle will be controlled independently of the others both on the tractor and on the trailer such that each axle will be furnished with a complete anti-lock brake control system, the brake systems on the several axles having in common only the manually controlled air pressure which is supplied at the will of the vehicle operator.

A system for which this invention is utilized follows the well established principle of sensing incipient wheel lockup when brake pressure is applied to vehicle brakes, then releasing the brake pressure until the wheel accelerates to a speed near that which is normal for a braked wheel and then reapplying the pressure. This cycle is repeated as necessary to achieve the desired braking action.

One channel of the system employs an improved version of the inertia wheel velocity reference principle which is fully set forth in the U.S. Pat. No. to Harned 3,554,612. That principle involves measuring the velocity of the braked wheel and subtracting therefrom a simulated vehicle velocity and utilizing the difference as a criterion of when the wheel brakes should be released and reapplied for most effective control. In practice, this principle has been applied by comparing the wheel deceleration with a vehicle deceleration estimate and integrating the difference to obtain a signal representing velocity error or the amount by which the vehicle speed estimate exceeds the wheel speed. This velocity error is then compared to a threshold value by a comparator circuit which issues a brake release signal when the velocity error exceeds the threshold and a reapply signal when the velocity error signal drops below the threshold. The estimated vehicle deceleration is determined in a manner which makes allowance for the coefficient of friction of a surface on which the wheel is traveling as well as the loading on the wheel. The comparator threshold is varied according to wheel speed to adjust system sensitivity. Circuits are provided to override the release signal from that channel under certain conditions to be described to improve braking performance.

Figure 1:
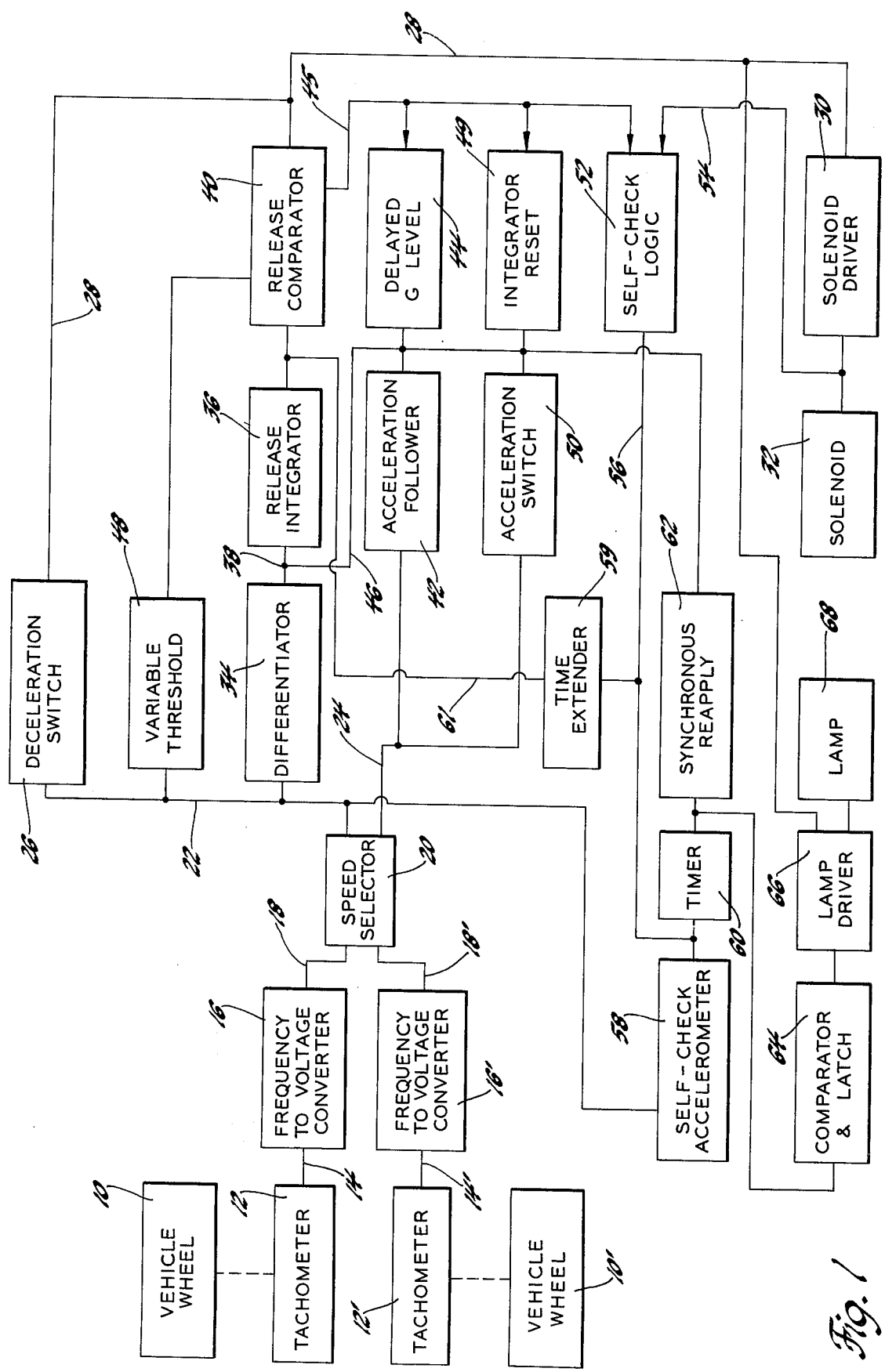
FIG. 1 is a block diagram of an anti-lock brake control apparatus according to the invention.

The term "acceleration" as used herein refers to both positive acceleration and deceleration unless otherwise specified. As shown in FIG. 1, vehicle wheels 10 and 10' are connected with tachometers 12 and 12' respectively for sensing the wheel speeds. The tachometers are preferably toothed wheel variable reluctance, electromagnetic transducers providing a signal having a frequency proportional to wheel speed on lines 14 and 14' which are connected to frequency to voltage converters 16 and 16'. The converters 16 and 16' provide on lines 18 and 18' electrical analogue signals proportional to wheel speed. The analogue signals are fed to a speed selector 20 which transmits to lines 22 and 24 the analogue signal representing the lowest wheel speed. Alternatively for some applications, an average or the highest wheel speed can advantageously be used to provide the speed signal. The speed signals on the lines 22 and 24 are identical, the purpose of two lines being to ease the load on the output sections of the speed selector 20.

A first control channel comprises a deceleration switch circuit 26 having the speed signal on line 22 as its input and providing a brake release control signal on line 28 whenever the rate of decrease of the speed signal indicates that the selected wheel decelerates at a predetermined value which is greater than the maximum linear deceleration which can be achieved by the vehicle. A value of 1 or 2 g's is preferably used as the deceleration threshold and is indicative of incipient wheel lock. The brake release control signal from the deceleration switch 26 is maintained until some time after the wheel begins to accelerate.

A solenoid driver 30 responsive to the release control signal on line 28 amplifies that signal to energize a solenoid 32 which is effective to cause brake release and maintain brake release only so long as the release control signal is sustained on line 28.

A second control channel includes as its primary components a differentiator 34 having its output connected to a release integrator 36 through a summing junction 38 and a release comparator 40 responsive to the output of the release integrator and providing at its output on line 28 a release control signal. An acceleration follower circuit 42 connected to the line 24 and a delayed g level circuit 44 connected to an output of the release comparator 40 on line 45 each have outputs carried by line 46 to the summing junction 38. The outputs together comprise a vehicle deceleration reference signal. The differentiator circuit 34 is responsive to the wheel speed signal to provide an output representing wheel acceleration. The wheel acceleration signal from the differentiator 34 is summed at point 38 with the vehicle deceleration reference signal, the algebraic sum of which provides the input of the release integrator 36. During wheel deceleration, that input is the difference between wheel deceleration and the estimated vehicle deceleration and the time integrated value displayed at the output of the release integrator is the difference between wheel speed and estimated vehicle speed, referred to herein as velocity error or deviation from synchronous speed. The release comparator 40 then compares the velocity error signal with a threshold value indicative of incipient wheel lock and produces a brake release control signal on line 28 when the velocity error exceeds the threshold signal. The release comparator has a built-in threshold corresponding to 5 mph which is changed to 3 mph upon brake release to provide hysteresis for the rejection of ripple. A variable threshold circuit 48 provides a further threshold contribution increasing linearly with wheel speed at the rate of 1 mph for each 10 mph increase in the selected wheel speed.

The acceleration follower circuit 42 differentiates the speed signal on line 24 and provides an output on the line 46 which is a function of the positive wheel acceleration occurring during each brake release cycle of anti-lock braking. The output of the acceleration follower increases substantially linearly during increasing acceleration from zero at 1 g acceleration to a value representing 0.75 g's at 2 g's acceleration. The follower further senses the peak positive acceleration and produces a corresponding output which decays at a slow rate having a time constant of 0.55 seconds so that the signal level on line 46 is strongly influenced in each cycle (other than the first cycle) by the positive wheel acceleration in the previous cycle.

The delayed $g$ level circuit 44 has as its input the release comparator signal on line 45 and adds to the reference signal on line 46 a contribution representing 0.8 g's a delayed time after brake application. The time of delay is very short and the contribution is gradually applied with a time constant of 0.6 seconds after an apply signal is present on line 45. Thus normally prior to anti-lock brake operation, the full 0.8 g's is contributed to line 46. The delayed g level signal, however, is terminated whenever a brake release signal is applied to line 45. Thus after the initial release in anti-lock braking operation, the contribution of the delayed $g$ level circuit is gradually applied with a time constant of 0.6 seconds after each apply signal appears on line 45.

An integrator reset 49 has its input connected to line 45 and its output connected to line 46. Each time the release comparator 40 terminates the release control signal to effect brake reapplication, the corresponding signal on line 45 triggers the integrator reset circuit to produce a 10 millisecond pulse which is fed to the summing junction 38 to bias the release integrator 36 into its normal condition signalling zero velocity error. This insures that any erroneous vehicle deceleration estimates from previous cycles are not accumulated.

The operation of the basic portion of the second channel is to produce a release control signal on line 28 when the wheel deceleration is greater than the estimated vehicle deceleration signal and sufficient time has elapsed for the release integrator to accumulate a velocity error greater than the variable threshold in the release comparator. The release signal normally is sustained until sufficient wheel speed recovery takes place to lower the velocity error to the value of the variable threshold of the release comparator; then termination of the release control signal causes brake reapplication. When the wheel deceleration is lower than the switch point of the deceleration switch 26 and is greater than the estimated vehicle deceleration on line 46, then the control signal from the second channel will occur prior to that from the first channel to cause brake release so that the first channel is ineffective. However, in the event of a high wheel deceleration, the deceleration switch 26 will provide a release control signal on line 28 before any such signal is produced by the second channel. If the second channel shall have produced a similar release signal before the deceleration switch 26 switches off, the second channel maintains the brake release and controls the time of brake reapplication. In certain instances, it is desirable to modify the time of brake reapplication, for example, by the acceleration switch 50.

The acceleration switch 50 has its input connected to line 24 carrying the selected wheel speed signal and has its output connected to line 46. When positive wheel acceleration exceeds 3 $g$'s, the acceleration switch 50 produces an output signal sufficiently large to quickly bias the release integrator 36 to its normal (zero velocity error) state causing brake reapplication. The result is that a reapply signal will occur earlier when the vehicle is on a high coefficient surface to anticipate wheel speed recovery thereby compensating for delays in the brake apply mechanism to provide more efficient braking.

The remainder of the circuit of FIG. 1 provides a self-check service to monitor malfunctions in the control and in addition provides a control function by furnishing an additional means to modify the brake reapplication time. A self-check logic circuit 52 has inputs connected to the line 45 from the release comparator and from line 54 connected to the output of the solenoid driver. During brake application, the signal on line 45 is low while the signal on line 54 is high. As long as that condition occurs, the self-check logic circuit 52 produces a continuous reset output signal on line 56. That reset signal is terminated when either of the signals on line 45 and 54 change state indicating that a release signal has been given or requested. A self-check accelerometer 58 is connected to line 22 to receive the speed signal therefrom. The accelerometer 58 differentiates the speed signal and monitors the wheel acceleration and produces an output signal whenever the positive wheel acceleration is greater than 0.5 $g$'s and wheel decelerations greater than 1.5 $g$'s occur. The output signal comprises a reset signal on line 56. The absence of an output signal from the self-check accelerometer 58 indicates that the selected wheel deceleration or acceleration is small and that measurement is interpreted as meaning that the selected wheel is at or near synchronous speed provided the condition persists and further provided the wheel velocity error (wheel speed deviation) is not large. A persistent synchronous wheel speed occurring during brake release indicates that the control circuit is not operating correctly, perhaps due to a poor vehicle deceleration estimate in the second channel or to an external system problem. Sometimes a poor vehicle deceleration estimate occurs when the vehicle has reached very low speeds and is nearly stopped. At such low speeds, only low wheel accelerations are possible and are not sufficient to provide optimum response of the deceleration estimate circuitry, e.g. the acceleration switch 50. Thus the synchronous reapply circuit will assure brake reapplication in that circumstance. A time extender circuit 59 has its input connected via line 61 to the output of the release integrator 36 and has its output connected to line 56. The time extender supplies to line 56 a small signal proportional to the wheel velocity error developed by the release integrator. The maximum value of the output signal of the time extender is too small to act as a timer reset signal.

A timer 60 has line 56 as its input. When a reset signal from the accelerometer 58 or the self-check logic 52 is present on line 56, the timer 60 is inoperative and its output is at a nominal zero value. When however, the brakes are released and the selected wheel evidences only low acceleration, there will be no reset signal on line 56 and the timer 60 will produce an output voltage increasing with time. The rate of increase of the timer output voltage is dependent on the signal from the time extender such that the timer voltage increases at a lower rate for high wheel velocity error. The timer output increases at a rate of 3.8 volts per second with zero velocity error and 0.3 volts per second with a maximum release integrator output.

A synchronous reapply circuit 62 connected to the timer output is triggered by a timer output voltage of about 2.0 volt which occurs at a minimum of 0.5 seconds of timer operation. The synchronous reapply output is a large output applied to the like 46 sufficient to quickly drive the release integrator to a condition forcing a brake reapplication. Thus if low wheel acceleration persists for 0.5 seconds during brake release and the wheel velocity error signal is zero, the timer to the synchronous apply circuit will effect the brake reapplication and if the low wheel acceleration was due to an erroneous vehicle deceleration estimate, the controller will correct itself on a new cycle and will continue to operate. If, however, the condition is caused by an external problem such as a solenoid failure, the circuit 64 described below will disable the controller. Where the wheel velocity error is large, then the time interval required to trigger the reapply circuit 62 is much larger than 0.3 seconds. This operation is illustrated in FIGS. 2a and 2b.

Figure 2A:
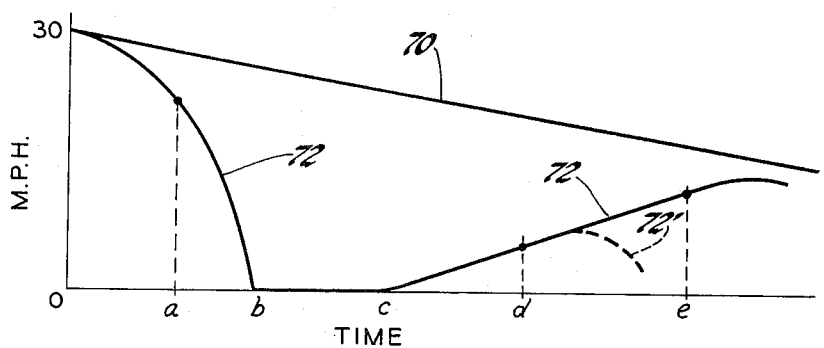
FIG. 2a and 2b are graphical representations of wheel speed and timer voltage respectfully with respect to time.
Figure 2B:
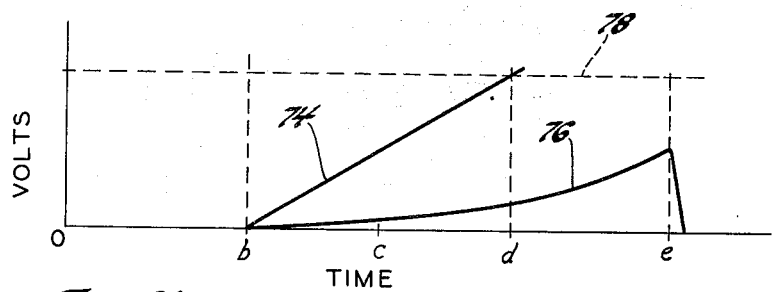

FIG. 2a includes a line 70 representing vehicle speed, while curve 72 represents wheel speed for a truck on low coefficient pavement and having a slowly responding pneumatic brake system. As the brakes are applied at time zero, the wheel speed 72 is quickly reduced and a brake release is requested by the control circuit at point a. Before the brakes are fully released, the wheels reach zero speed at point b and remain locked until point c when a slow wheel acceleration begins. Referring to FIG. 2b which depicts timer output voltage during the time of the brake release, line 74 represents the timer output voltage which would occur in the absence of the signal from the time extender 59 while the signal 76 represents the signal which actually occurs with the time extender in operation. The horizontal line 78 represents the trigger voltage of the synchronous reapply circuit 62. Considering first the line 74, it is seen that the timer voltage begins increasing at point b, since the wheel acceleration is small and continuous beyond point c, since the wheel acceleration continues to be too small to apply a reset signal to line 56. Then at point d, the signal 74 becomes large enough to trigger the synchronous reapply circuit causing a brake reapplication. Then the brake reapplication would cause the wheel speed to follow line 72' which does not allow the wheel speed to properly recover but rather may create another wheel lock condition. On the other hand with the time extender in operation, the voltage as shown by line 76 starts increasing at point b, however, since the wheel velocity error (ideally the vertical distance between line 70 and 72) is large, the slope of the curve 76 is small. The slope increases, however, as the wheel velocity error becomes smaller. As the wheel speed 72 increases to point e, the control circuit requests a brake reapplication since the wheel velocity error has become small and the wheel speed approaches the vehicle speed 70. The synchronous reapply circuit 72 is not triggered since the curve 76 does not reach the voltage 78 and a premature reapply is avoided. At point e, a reset signal is impressed on line 56 to quickly reset the timer to zero voltage.

A comparator and latch 64 senses the timer output voltage and will produce an output when the timer output reaches 5.0 volts and the output will be latched on even if the timer output is subsequently removed. A lamp driver 66 is actuated by the output of the comparator and latch output 64 and provides two output signals, one of which is effective to ground line 28 to disable the solenoid driver 30 thereby disabling the controller. The second output will illuminate a lamp 68 to alert a vehicle operator that the controller has been disabled and the braking will continue under manual control.

Figure 3:
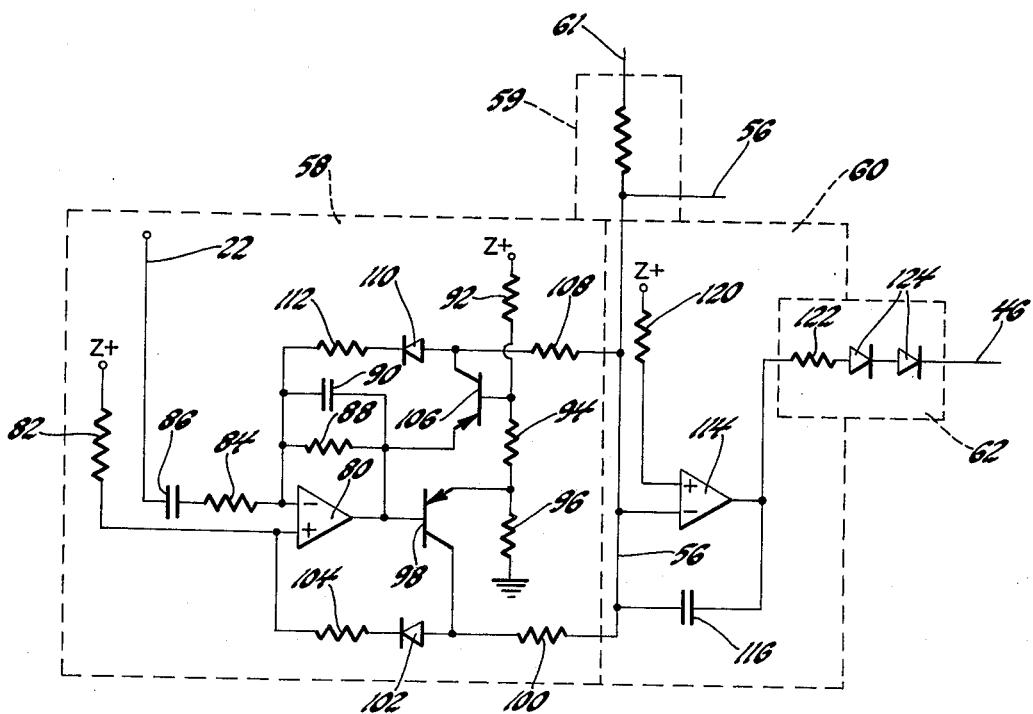
FIG. 3 is a schematic electrical diagram of a portion of the anti-lock brake control apparatus of FIG. 1.

FIG. 3 schematically illustrates the self-check accelerometer 58, time extender 59, the timer 60 and the synchronous reapply circuit 62. A power supply, not shown, provides a regulated voltage Z+. The self-check accelerometer 58 includes an operational amplifier 80 having its positive input connected through resistor 82 to Z+ and its negative input connected through a resistor 84 and a differentiating capacitor 86 to line 22. A feedback resistor 88 between the operational amplifier output and the negative input establishes the amplifier gain while a capacitor 90 parallel therewith provides filtering. A voltage divider comprising resistors 92, 94 and 96 serially connected between Z+ and ground provides reference potentials at the resistor junctions. A transistor 98 has its base connected to the output of the amplifier output 80, its emitter connected to one of the resistor junctions and its collector connected through a resistor 100 to line 56. The collector is further connected through a feedback circuit comprising a diode 102 and a resistor 104 connected to the positive input of the operational amplifier. A second transistor 106 has its emitter connected to the amplifier output, its base connected to the other resistor junction and its collector connected through resistor 108 to the line 56.

The collector is also connected through a feedback circuit comprising a diode 110 and resistor 112 to the negative input of the amplifier. In operation, the resistor 82 passes sufficient bias current to the amplifier to provide a nominal output signal of 3 volts. The wheel speed signal on line 22 is differentiated by the capacitor 86 such that in the event of positive wheel acceleration, the amplifier output voltage is caused to decrease and during wheel deceleration the amplifier output will increase. The transistors 98 and 106 are biased off due to the reference potential supplied by the voltage divider when the amplifier output is at the nominal 3 volt level. Transistor 98 will turn on, however, to provide an output to line 56 when the amplifier voltage drops to 2 volts representing a wheel acceleration of 0.5 $g$'s and the transistor 106 will similarly turn on to provide an output when the amplifier output reaches 7 volts corresponding to a wheel deceleration of 1.5 $g$'s. The two feedback circuits from the transistor collectors to the amplifier inputs limit the amplifier gain to prevent the input from being pulled out of the linear operating range of the amplifier. The self-check accelerometer 58 then provides an output to line 56 whenever positive or negative wheel acceleration occurs beyond the described limits. There is no output for small positive or negative accelerations.

The time extender 59 comprises a large resistor connected between lines 61 and 56 thereby supplying a current to line 56 proportional to the output voltage of the release integrator 36 or wheel velocity error. The large resistor limits current flow to values too small to cause time reset. The self-check timer 60 comprises an integrator having an operational amplifier 114 with an integrating feedback capacitor 116 between the output and the negative input thereof. The positive input is connected through a resistor 120 to Z+ while the negative input is connected to line 56 carrying the reset signals from self-check accelerometer 58 and the self-check logic circuit 52 as well as the signal from the time extender 59. When there is a large current in line 56 indicating either a brake apply condition or a non-synchronous wheel speed, the operational amplifier is biased to a low output state. When, however, the large current in line 56 is removed, the amplifier output gradually increases due to bias current on the positive input such that the magnitude of the voltage output is related to the time period of operation of the timer since the removal of a high signal from line 56 as well as the current from the time extender 59 flowing to the negative input of the amplifier 114. The rate of increase of the timer output ranges from 0.3 volts per second to 3.8 volts per second according to the wheel velocity error.

The synchronous reapply circuit 62 comprises a current limiting resistor 122 and two diodes 124 serially connected between the output of the timer 60 and line 46. The diodes prevent conduction of the synchronous reapply circuit until the timer output reaches about 2.0 volts at which time a large current is fed to line 46 and the junction point 38 to quickly drive the release integrator to a low state requiring brake reapplication. Thus the brakes are reapplied providing that during the time delay the brakes remain released and the wheels maintain a low positive or negative acceleration. If at any time during the delay period, the brakes become reapplied or the wheel acceleration or deceleration exceeds the limits of the self-check accelerometer, the timer will be reset and the synchronous reapply circuit does not produce an output.

It will thus be seen that the control according to this invention provides a reapply current which discriminates between those conditions where a long brake release is desirable and those in which it is undesirable.

The embodiments of the invention in which an exclusive property or privilege is claimed are defined as follows:

1. A control apparatus for an anti-lock brake system for a vehicle with braked wheels comprising
   means providing a speed signal which represents wheel speed,
   a control circuit for producing an on/off control signal,
   release means activated by the control signal to effect brake release when the control signal is initiated and brake reapplication when the control signal is terminated,
   the control circuit including means responsive to the speed signal for deriving a velocity error signal representing the difference between wheel speed and an estimated vehicle speed and means for producing the control signal when the velocity error signal exceeds a first threshold indicative of incipient wheel lock and terminating the control signal when the velocity error signal drops below a second threshold lower than the first threshold,
   reapply means effective during brake release for terminating the control signal when the wheel experiences low acceleration for at least a minimum time period,
   and means responsive to the instantaneous value of the velocity error signal for retarding the action of the reapply means and extending the time period when the velocity error signal is large.

2. A control apparatus for an anti-lock brake system for a vehicle with braked wheels comprising
   means providing a speed signal which represents wheel speed,
   a control circuit for producing an on/off control signal,
   release means activated by the control signal to effect brake release when the control signal is initiated and brake reapplication when the control signal is terminated,
   the control circuit including means responsive to the speed signal for deriving a velocity error signal representing the difference between wheel speed and an estimated vehicle speed and means for producing the control signal when the velocity error signal exceeds a first threshold indicative of incipient wheel lock and terminating the control signal when the velocity error signal drops below a second threshold lower than the first threshold,
   reapply means effective during brake release for terminating the control signal when the wheel experiences low acceleration for at least a minimum time period including timer means for producing an output ramp signal increasing at a preset maximum rate and a reapply circuit responsive to a preset value of the output ramp signal for terminating the control signal,
   and means for retarding the action of the reapply means when the velocity error signal is large comprising a circuit responsive to the velocity error signal for providing to the timer means an input signal substantially proportional to the instantaneous value of the velocity error signal for reducing the rate of increase of the output ramp signal thereby extending the time period required to attain the preset value of the output ramp signal and to terminate the control signal.

3. A control apparatus for an anti-lock brake system for a vehicle with braked wheels comprising means providing a speed signal which represents wheel speed, a control circuit for producing an on/off control signal, release means activated by the control signal to effect brake release when the control signal is initiated and brake reapplication when the control signal is terminated, the control circuit including means responsive to the speed signal for deriving a velocity error signal representing the difference between wheel speed and an estimated vehicle speed and means for producing the control signal when the velocity error signal exceeds a first threshold indicative of incipient wheel lock and terminating the control signal when the velocity error signal drops below a second threshold lower than the first threshold, reapply means effective during brake release for terminating the control signal when the wheel experiences low acceleration for a first time period, and disabling means effective during brake release for disabling the control circuit to return the brake system to manual control when the wheel experiences low acceleration for a second time period greater than the first time period, and means responsive to the instantaneous value of the velocity error signal for retarding the action of the reapply means and the disabling means and extending the first and second time periods when the velocity error signal is large.

* * * * *